June 9, 1936.  E. B. THOMPSON  2,043,636
FLUID MEASURING DEVICE
Filed May 22, 1933   3 Sheets-Sheet 1
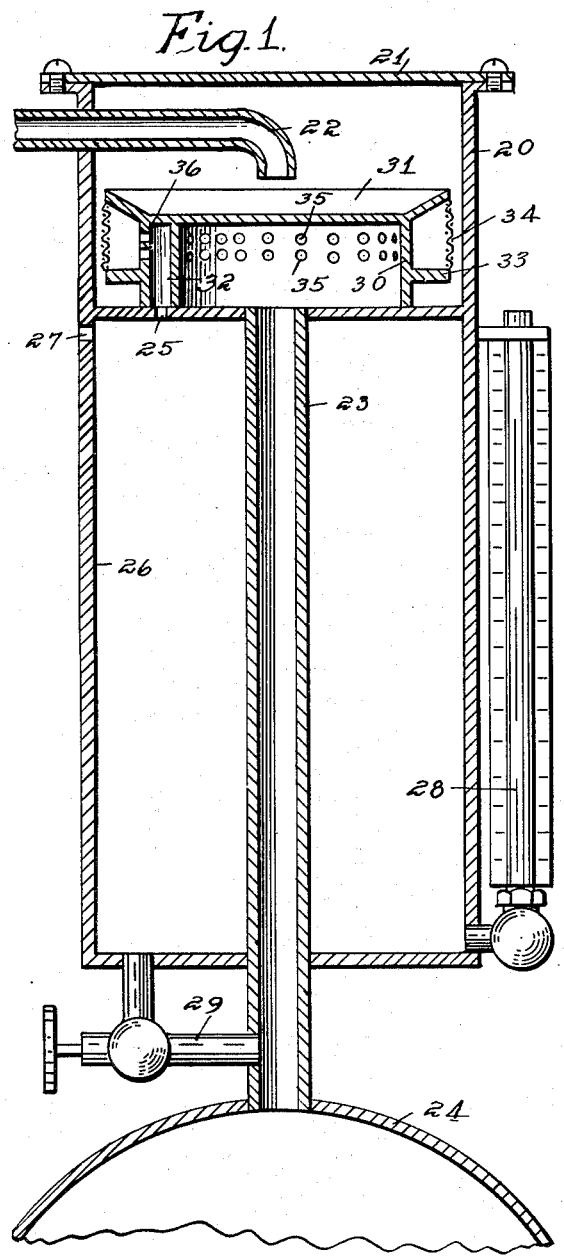
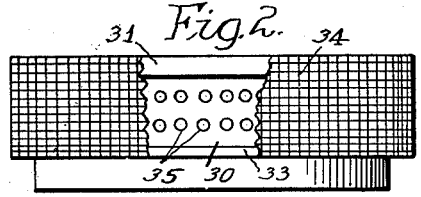
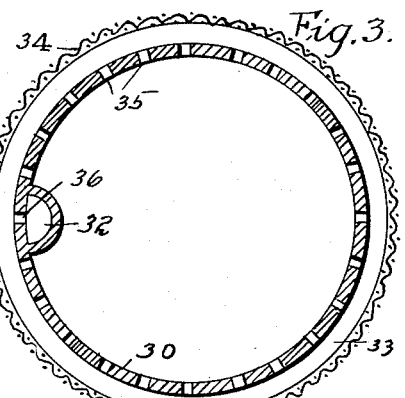
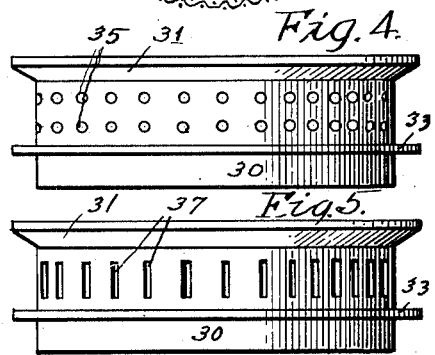
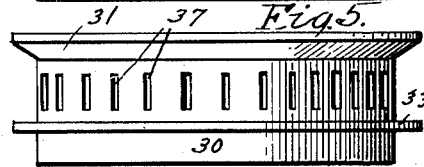
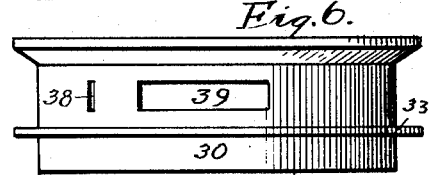
Inventor
Elmer B. Thompson

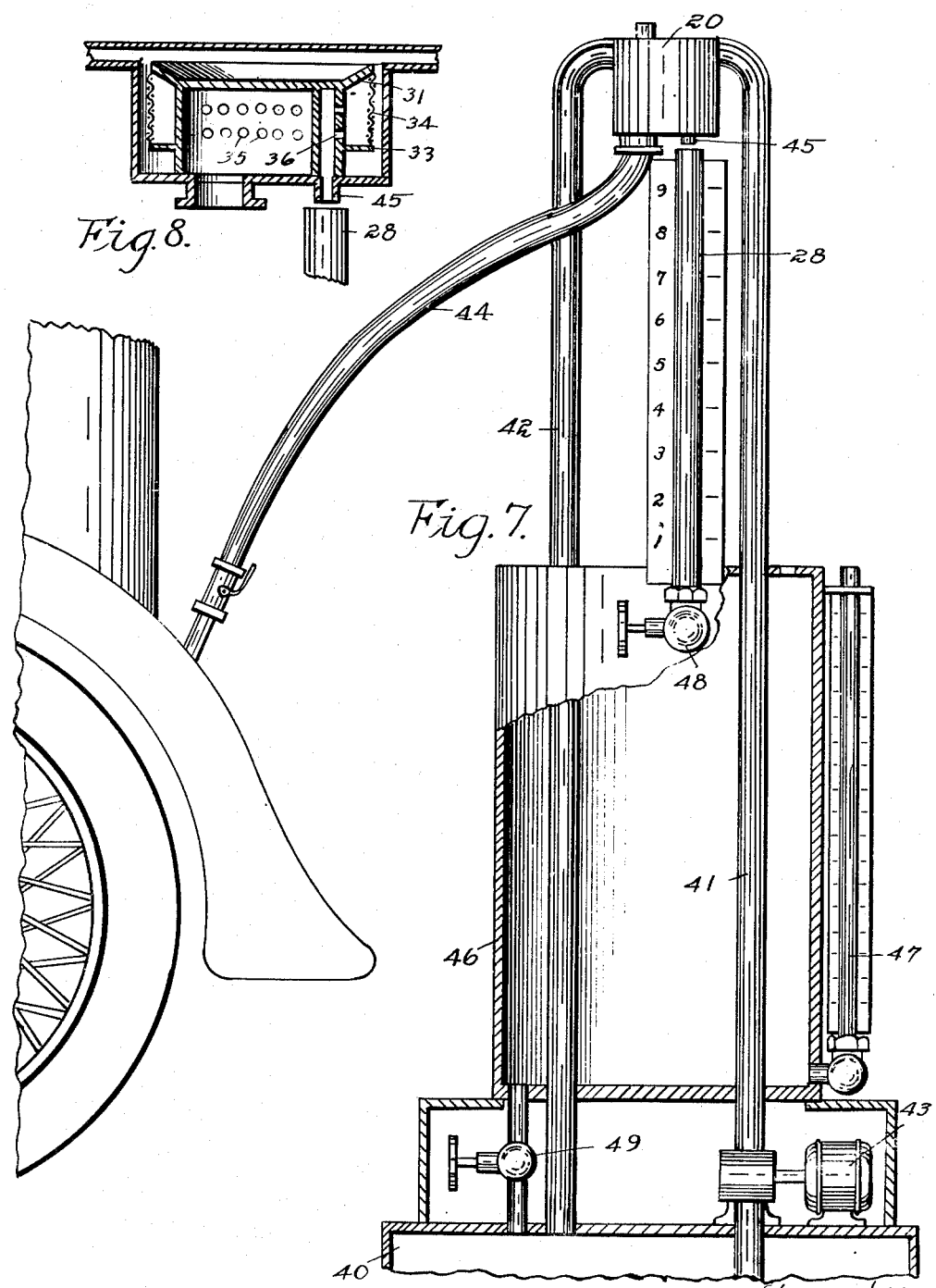

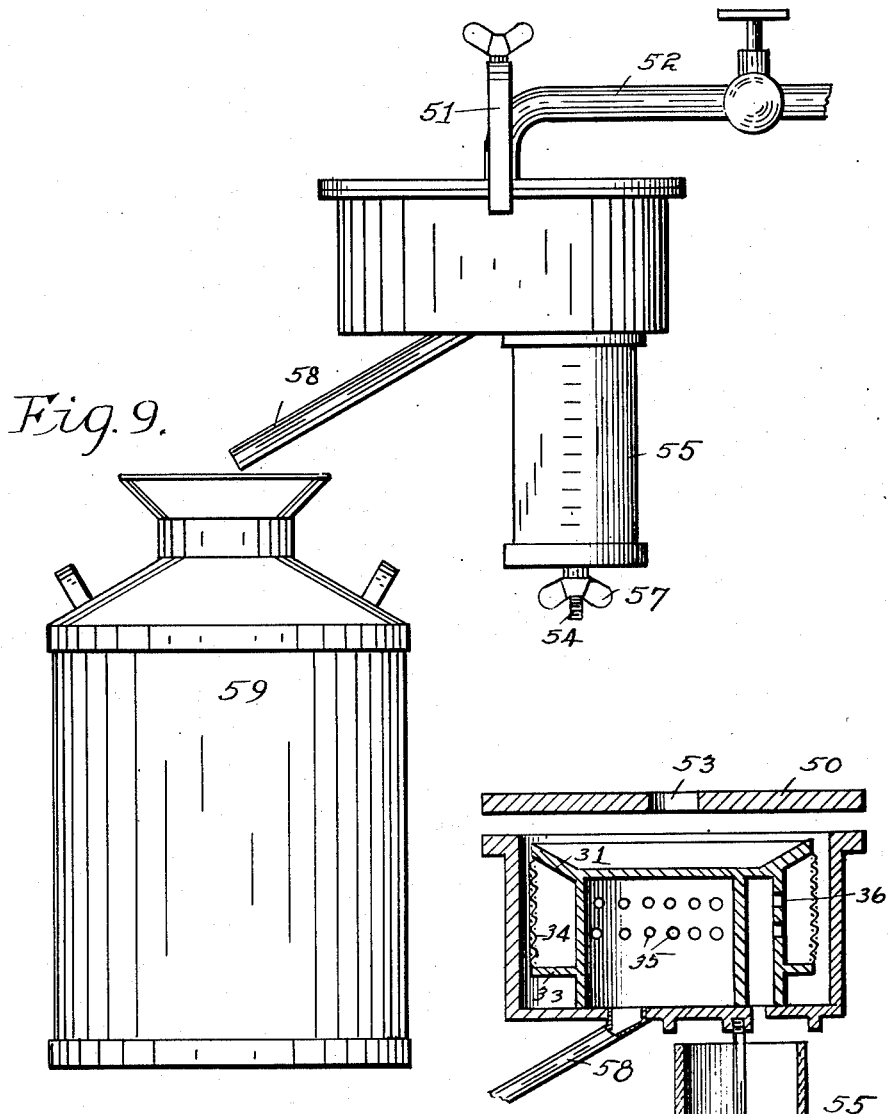

Patented June 9, 1936

2,043,636

UNITED STATES PATENT OFFICE 2,043,636

FLUID MEASURING DEVICE

Elmer B. Thompson, Des Moines, Iowa, assignor to Swanson & Thompson, Des Moines, Iowa, a partnership composed of F. W. Swanson and Elmer B. Thompson Application May 22, 1933, Serial No. 672,157

3 Claims. (Cl. 73—202)

The objects of my invention are to provide a fluid measuring device of simple, durable and inexpensive construction and without working parts, and whereby a quantity of fluid may be permitted to flow from a source of supply to a point of discharge and an accurately measured proportional part of said fluid will, during the same time, be conducted into a gauge device where its amount will be visibly indicated and from which it may be determined with accuracy the gross amount of the liquid flowing from the supply to the discharge.

A further object is to provide a device of this character in which the proportionate amounts of liquid delivered to the gauge and to the point of discharge will be constant under all conditions, and will not be affected by pressure applied to the liquid at any point or by having the flowing liquid impinge directly upon any of the liquid passageways.

A further object is to provide a device of this class especially designed for supplying gasoline to automobiles, and so constructed and arranged that in addition to visibly indicating the amount of gasoline which the attendant delivers into each automobile, it will also visibly indicate to the attendant the total amount of gasoline withdrawn from the storage tank during a certain predetermined period of time; and also in this connection it is my object to provide means whereby the fluid admitted into the gauges or visible indicators will be returned to the storage tank.

A further object is to provide a device of this character especially designed for measuring milk or the like, and to provide a measuring device of this kind without working parts, and so arranged that all of the parts thereof may be readily, quickly and easily removed and replaced for cleaning purposes.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a vertical central sectional view of a fluid measuring device embodying my invention.

Figure 2 shows a side elevation of the separating chamber with a portion of the screen removed.

Figure 3 shows a horizontal sectional view of same through one of the rows of perforations thereof.

Figure 4 shows a side elevation of the separating chamber with the screen removed.

Figure 5 shows a similar view of a modified form.

Figure 6 shows a similar view of another modification.

Figure 7 shows a side elevation partly in section of a modified form of my improved measuring device, especially adapted for automobile servicing, and illustrating a portion of a gasoline supply tank and a part of an automobile in position to be filled.

Figure 8 shows a vertical, central, sectional view of a modified form of measuring chamber and separating device.

Figure 9 shows a side elevation of a modified form of my improvement especially designed for measuring milk or the like, showing a milk can in position to receive the discharge from the measuring device.

Figure 10 shows a vertical central sectional view through the modified form of the device shown in Figure 9 with the cover and the gauge device slightly separated to show its detachability.

Referring to the accompanying drawings I have used the reference numeral 20 to indicate generally the measuring chamber provided with a detachable cover 21, and having a pipe 22 admitted into its upper portion for receiving liquid from a source of supply.

In the bottom of the liquid chamber is a large central opening through which the discharge pipe 23 is extended and which leads to a tank 24, and in the bottom of the measuring chamber is a small passageway 25 leading into a compartment 26, which is provided near its top with a vent opening 27, and there is an ordinary glass sight gauge 28 in communication with the lower end of the compartment 26; this gauge is open at its top. I also preferably provide a valve controlled pipe 29 leading from the compartment 26 to the tank 24.

Mounted within the measuring chamber is the device which I have termed the separating device, and which comprises a cylindrical upright wall 30 open at its bottom and provided with a top 31. The outer edges of the top 31 extend outwardly beyond the wall 30, and this chamber is preferably arranged centrally below the supply pipe 22.

On the interior of the wall 30 is a tube 32 closed on all sides and placed directly over the passageway 25. On the lower portion of the wall 30 is an outwardly extended flange 33 and a screen 34 is preferably supported on the top 31, and the flange 33.

This wall 30 is provided with a series of horizontally arranged rows of perforations 35, and the part of the wall adjacent the tube 32 is provided with one perforation 36, for each row of perforations 35, and the proportionate size of these perforations is such that a very small quantity of liquid will flow through the perforations 36 and through the tube 32 into the compartment 26, during the same time a relatively much larger quantity of fluid will flow through the perforations 35 and the pipe 23 into the tank 24.

In order to provide great accuracy in measuring, the parts of the measuring device are all fixed in their positions so there is no variation on account of friction, and furthermore the rows of measuring perforations are all arranged in the same horizontal plane, or at the same fluid level, and in addition to this I provide for having at all times uniform liquid pressure applied to the liquid going through the measuring passageways, and for this purpose I cause the liquid to be discharged into the top of the measuring chamber upon the top of the separating device, and from which it flows outwardly uniformly in all directions and then passes to the bottom of the measuring chamber, and gradually builds up until it reaches the fluid level of the lower row of perforations, and when this is done, it flows by gravity through these perforations, so that at all times pressure upon each perforation is exactly the same and an exact proportionate amount will pass through the small perforation 36 and correspondingly greater amounts will pass through the row of perforations 35 on the same fluid level as the perforations 36. By having the flange 31 inclined upwardly and outwardly, a more even and uniform flow of liquid over the top of the flange 31 is attained.

In addition to this, the employment of a fine meshed screen 34 assists in causing a uniform flow of fluid into the separating chamber, and at the same time prevents any solid substances from entering any of the measuring perforations.

In the modified form illustrated in Figure 5, I have shown a series of vertically arranged slots 37 instead of the perforations, and in Figure 6 I have shown one small vertically arranged slot 38 as a substitute for the perforations 36, and one large slot 39 as a substitute for the row of perforations 35.

In the modified form of my invention illustrated in Figure 7, I have shown a gasoline supply tank 40. These are usually placed under ground. From this tank there is a gasoline supply pipe 41 leading upwardly and discharging into the measuring chamber 20 at one side, and on the opposite side is a return pipe 42 through which the overflow from the measuring chamber, if any, will return to the tank 40.

Applied to the supply pipe 41 is a motor and pump device of ordinary construction indicated generally by the reference numeral 43 for elevating the gasoline from the supply tank to the measuring compartment 20.

A flexible hose 44 is provided for conducting the main body of gasoline going through the separating chamber into an automobile tank or the like, and the gasoline flowing through the tube 32 is conveyed through a small pipe 45 into the gauge device 28.

Beneath the gauge device 28 is a tank 46 also provided with a sight gauge device 47 open at its top, and liquid from the gauge device 28 may be caused to flow into the tank 46 through the valve controlled pipe 48, and from the tank 46 the liquid may be caused to flow into the tank 40 through the valve controlled pipe 49.

In practical use with this form of my invention, and when it is desired to fill an automobile, the operator starts the pump 43, and then a proportionate amount of the gasoline which flows through the hose 44 will be discharged into the gauge 28. When the automobile is filled, and the pump stopped, the gauge will show exactly the amount of gasoline delivered to the automobile.

When a certain operator goes on duty he sees to it that the tank 46 is empty, and then after each automobile has been filled, the operator opens the valve controlled pipe 48, causing all the gasoline in the gauge 28 to enter the compartment 46 and be visibly indicated on the gauge 47. Then at the end of a certain predetermined period of time, the operator may by a glance at the gauge 47 accurately determine just how much gasoline has been withdrawn from the tank 40 during said period of time.

In the modified form shown in Figures 9 and 11, I have provided a detachable cover 50 for the measuring chamber held in place by a screw clamp device 51 of ordinary construction, and a fluid supply pipe 52 extends through an opening 53 in the cover. On the under surface of the measuring chamber, I have provided a screw rod 54, and a glass cylinder or sight gauge 55 is made to surround this rod and is held against the bottom of the measuring chamber by a disk shaped bottom member 56, which may be clamped into position by a wing nut 57 thereon. The main discharge pipe of this form of the invention is indicated by the reference numeral 58 and is arranged to discharge into a can 59.

In practice with this form of the invention, which liquid enters the gauge 55 through the openings 36 is especially designed for use with milk or the like, and after a certain period of use, the operator may, by simply removing the clamp 51 and the wing nut 57, separate all of the parts of the device so they may be readily and easily cleaned.

In practical use with my improvement I have found that due to the absence of moving parts, I have eliminated one source of inaccuracy in gauge devices of this character due to variable degrees of friction. Furthermore by having the perforated wall of the separating device in fixed position, and by having all of the measuring perforations arranged at the same fluid level, and by eliminating the possibility of variable pressures applied to the several measuring perforations, I am enabled to visibly indicate upon the gauge the quantity of liquid passing through the device with greater accuracy than is commonly done with the mechanically operated measuring devices now in common use, but at the same time I have provided an apparatus much cheaper in construction than those now in use and less liable to get out of order.

In use it is desirable to control the fluid supply entering the measuring chamber so that the fluid enters at about the same speed as it discharges, so that flow through the passageway will be uniform, and by having the top of the measuring chamber open to the atmosphere the pressure on the fluid passing through the measuring openings will be constant.

In the accompanying claims in which is employed the words "a small passageway and also with a large passageway" it is intended to cover for the large passageway either a single large opening or a series of small openings.

I claim as my invention:

1. A fluid measuring device comprising a measuring chamber, a receptacle for fluid below and in communication with said measuring chamber, a gauge applied to said receptacle, and a separating device within said chamber formed with a small passageway leading to said receptacle and with a large passageway leading to a point of discharge, a second receptacle below the first, a valve controlled fluid conductor between said receptacles, and a gauge device for the second receptacle.

2. A fluid measuring device comprising a measuring chamber, means associated with the measuring chamber for delivering a major portion of fluid in said measuring chamber to a point of discharge and for delivering a minor proportionately measured portion of said fluid to another point of discharge, a receptacle arranged to receive the said minor portion of said discharge, a gauge associated with said receptacle, a second receptacle, manually controlled means for discharging fluid from the first receptacle to the second receptacle, and a gauge associated with said second receptacle, for the purposes stated.

3. In a fluid measuring device, the combination of a measuring chamber, means for conducting fluid into said chamber, a continuous wall extended from the bottom of said chamber upwardly within the chamber, a solid deflector top covering said wall and projected laterally on all sides beyond the wall for causing the incoming fluid to be deflected equally in all directions and to flow by gravity downwardly beyond said wall, means for conducting fluid from the central portion of the space defined by said wall, and a separate means for conducting fluid from the interior of the space defined by said wall, and one or more openings in said wall spaced above the bottom of the wall for permitting a major portion of the fluid in said chamber to enter the space within the wall, and another opening in said wall for permitting a smaller measured quantity of fluid in said chamber to enter said separate means for conducting fluid from said chamber, and whereby the pressure or current flow of the liquid will be equalized and minimized before entering said openings and a proportionate amount of said fluid will at all times flow through said second separate means for conducting fluid from the chamber.

ELMER B. THOMPSON.